United States Patent [19]

Klatt

[11] Patent Number: 4,960,075

[45] Date of Patent: Oct. 2, 1990

[54] CAT TOY

[76] Inventor: Larry F. Klatt, 9959 Wolfe St., R.R. #2, Mission, British Columbia V2V 4H9, Canada

[21] Appl. No.: 408,866

[22] Filed: Sep. 5, 1989

[51] Int. Cl.$^5$ ............................................. A01K 15/00
[52] U.S. Cl. ...................................................... 119/29
[58] Field of Search ............... 119/29, 29.5; 15/229.1, 15/229.2, 229.3, 229.6, 229.7; 43/137

[56] References Cited

U.S. PATENT DOCUMENTS

| | | | |
|---|---|---|---|
| D. 97,721 | 12/1935 | Stam | 119/29 |
| D. 298,871 | 12/1988 | Killen | 119/29 |
| 1,711,242 | 4/1929 | Morris | 15/229.2 |
| 2,364,800 | 12/1944 | Lipstock | 15/229.2 |
| 2,729,841 | 1/1956 | Littleton | 15/229.2 |
| 2,835,914 | 5/1958 | Littleton | 15/229.2 |
| 2,870,473 | 1/1959 | Schwartz | 15/229.2 |
| 2,880,437 | 4/1959 | Lohman | 15/229.2 |
| 3,315,640 | 4/1967 | Gamble | 119/29 |
| 3,633,975 | 1/1972 | Argeris et al. | 15/229.1 |
| 3,668,118 | 6/1972 | Rhodes | 15/229.1 |
| 4,114,224 | 9/1978 | Disko | 15/229.1 |
| 4,133,296 | 1/1979 | Smith | 119/29 |
| 4,288,884 | 9/1981 | Bahls | 15/229.2 |
| 4,438,727 | 3/1984 | Thompson | 119/29 |
| 4,770,123 | 9/1988 | Bell | 119/29 |

*Primary Examiner*—Paul J. Hirsch
*Attorney, Agent, or Firm*—Fetherstonhaugh & Co.

[57] ABSTRACT

A cat toy comprising a handle. A switch member is attached to the handle comprises a single piece of material with a continuous central area. Slits formed in the same piece of material to extend outwardly from each side of the strip area to the ends of the material. These strips divide the material at each side of the central area into a plurality of strips. A ferrule is clamped around the switch member and an end of the handle to attach the switch member to the handle. The device is a pleasing toy with which to amuse a cat. It is easily and economically made and can be a bright attractive appearance.

3 Claims, 1 Drawing Sheet

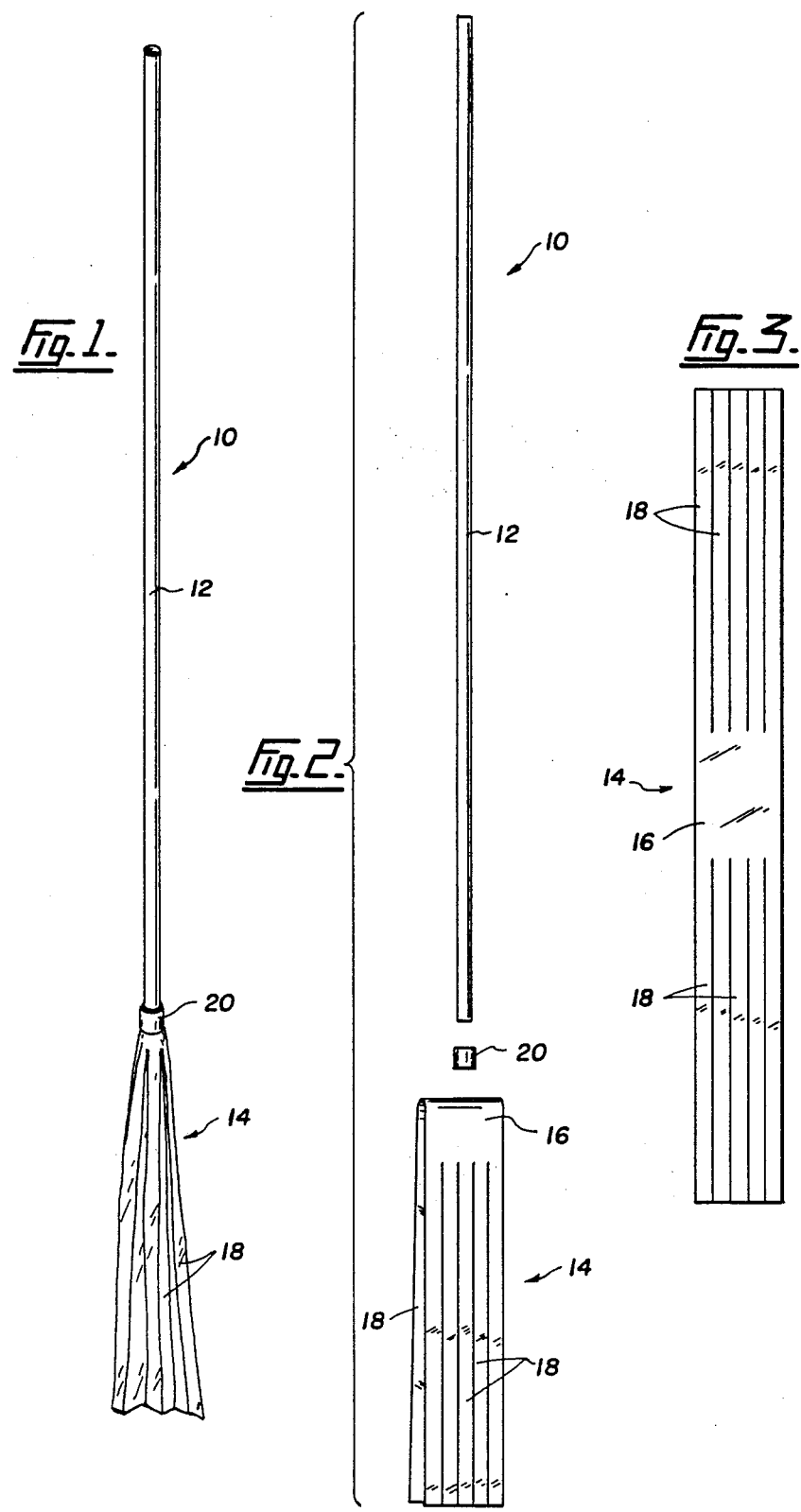

CAT TOY

FIELD OF THE INVENTION

This invention relates to a cat toy.

DESCRIPTION OF THE PRIOR ART

Cats are fascinated by any moving article. It is therefore common for cat owners to play with their cats and to exercise the cats by moving an article rapidly in front of the cat. Particularly with younger cats it is inevitable that the cat will pursue the moving article. It is common to use pieces of string and the like. The disadvantage of such articles is that they can become caught in the cat's claws.

The prior art known to applicant includes U.S. Pat. Nos. 4,120,115 to Mushkin; 161,870 to Dorrison; 3,829,923 to Shaw and U.S. Design Pat. No. 97,721 to Stam.

Of the above Mushkin discloses a switch in which the plurality of elongated flexible strands or filaments is secured to one end of a handle. The strands are made of a flexible plastic filament such as nylon or the like.

Shaw discloses a sweeping apparatus in which the strands are a mixture of polyvinyl chloride filaments and polypropylene filaments. Stam shows an exerciser that includes filaments and Dorrison teaches a switch for killing insects showing a handle separate from material that makes up the switch.

The present invention seeks to provide a cat toy that is simple to make, that is lightweight and has a flexible switch at one end that will not interfere with the cat's claws.

SUMMARY OF THE INVENTION

Accordingly, the present invention is a cat toy comprising:
  a handle;
  a switch member attached to the handle and comprising a single piece of material having a continuous centre area;
  a plurality of slits in the single piece of material extending outwardly from each side of the central area to the end of the piece of material, to divide the material to each side of the centre area into plurality of strips;
  a ferrule around the switch members and an end of the handle to attach the switch members to the handle.

BRIEF DESCRIPTION OF THE DRAWINGS

Aspects of the invention are illustrated, merely by way of example, in the accompanying drawings in which:

FIG. 1 is a view of a cat toy according to the present invention;
FIG. 2 is an exploded view of FIG. 1; and
FIG. 3 illustrates a detail of the toy.

DESCRIPTION OF THE PREFERRED EMBODIMENTS

The drawings show a cat toy 10 comprising a handle 12, typically a dowel, that may be any desirable lenght. As shown particularly in FIGS. 1 and 3 a switch member 14 is attached to the handle and that switch member comprises a single piece of material having a continuous central area 16 with a plurality of slits 18 in the single piece of material 16 extending outwardly from each side of the central area 16 - see FIG. 3. These slits 18 divide the material of each side of the central area into a plurality of strips.

There is a ferrule 20 crimped around the switch member 14 and an end of the handle 12 to attach the swtich member 14 to the handle 12. The arrangement is most clearly shown in FIGS. 1 and 2. To attach the switch member 14 the central portion 16, doubled over as shown in FIG. 2, is wrapped around the handle 12 and the ferrule 20 is then moved over the switch 14 and over the handle 12. The ferrule 20 may then be crimped, using pliers or a proper crimping tool, to hold the switch member on the handle.

The device can then be moved rapidly in front of a cat. Cats are colour blind but for the enjoyment of the owner the strips may be made of brightly coloured material. It should be noted that more than one switch member 14 may be used which introduces a number of bright colours into the toy.

The wooden handle 12 is desirably of hard wood of circular section but that is not essential. The ferrule 20 is desirably copper for ease of crimping but, again, any material that can be crimped easily can be used. The switch member is desirably of plastic, for example polyvinyl chloride or polyethylene.

I claim:
1. A cat toy comprising:
   a wooden dowel acting as a handle;
   a switch member attached to the handle and comprising a single piece of a light, flexible material having a continuous central area;
   a plurality of slits in the single piece of material extending outwardly from each side of the central area to the end of the piece of material, to divide the material to each side of the central area into a plurality of strips;
   a ferrule crimped around the switch member with the switch member wrapped around an end of the handle to attach the switch member to the handle.
2. A cat toy as claimed in claim 1 in which the switch member is a brightly coloured plastic strip.
3. A cat toy as claimed in claim 1 in which the ferrule is of copper.

* * * * *